Figure 1:
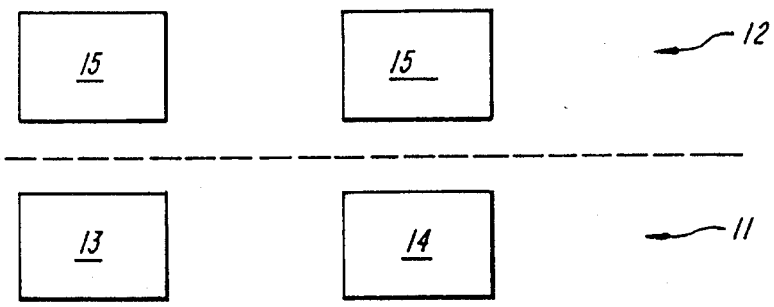

United States Patent
Mahvan et al.

[11] Patent Number: 5,470,447
[45] Date of Patent: Nov. 28, 1995

[54] METHOD FOR APPLYING A PROTECTIVE COATING ON A MAGNETIC RECORDING HEAD

[75] Inventors: Nader Mahvan, Cupertino; Atef H. Eltoukhy, Saratoga; Edward F. Teng, Sunnyvale, all of Calif.

[73] Assignee: StorMedia, Inc., Santa Clara, Calif.

[21] Appl. No.: 315,092

[22] Filed: Sep. 29, 1994

Related U.S. Application Data

[63] Continuation of Ser. No. 932,335, Aug. 19, 1992, abandoned.

[51] Int. Cl.$^6$ .................................................. C23C 14/34
[52] U.S. Cl. ........................... 204/192.16; 204/192.15; 204/192.2; 204/192.22
[58] Field of Search .................. 204/192.15, 192.16, 204/192.2, 192.22, 192.23, 298.23, 298.25, 298.26

[56] References Cited

U.S. PATENT DOCUMENTS

| | | | |
|---|---|---|---|
| Re. 32,464 | 7/1987 | Aine | 428/622 |
| 2,804,401 | 8/1957 | Cousino | 428/408 X |
| 3,911,579 | 10/1975 | Lane et al. | 204/192.16 X |
| 4,060,660 | 11/1977 | Carlson et al. | 428/408 |
| 4,277,540 | 7/1981 | Aine | 428/627 |
| 4,411,963 | 10/1983 | Aine | 428/622 |
| 4,486,286 | 12/1984 | Lewin et al. | 428/408 X |
| 4,495,242 | 1/1985 | Arai et al. | 428/336 |
| 4,503,125 | 3/1985 | Nelson et al. | 428/408 |
| 4,524,106 | 6/1985 | Flasck | 428/408 |
| 4,552,820 | 11/1985 | Lin et al. | 428/611 |
| 4,598,017 | 7/1986 | Bayer et al. | 428/336 |
| 4,626,336 | 12/1986 | Bloomquist et al. | 204/192.2 X |
| 4,647,494 | 3/1987 | Meyerson et al. | 428/216 |
| 4,661,409 | 4/1987 | Kieser et al. | 428/408 |
| 4,664,976 | 5/1987 | Kimura et al. | 428/336 |
| 4,670,972 | 6/1987 | Sakakima | 204/192.2 X |
| 4,675,075 | 6/1987 | Sakai et al. | 204/192.2 X |
| 4,713,288 | 12/1987 | Kokaku et al. | 428/336 |
| 4,717,622 | 1/1988 | Kurokawa et al. | 428/408 |
| 4,725,470 | 2/1988 | Katsuki | 428/64 |
| 4,737,419 | 4/1988 | Hilden et al. | 428/695 |
| 4,755,426 | 7/1988 | Kokai et al. | 428/336 |
| 4,774,130 | 9/1988 | Endo et al. | 428/216 |
| 4,786,564 | 11/1988 | Chen et al. | 428/694 |
| 4,789,598 | 12/1988 | Howard et al. | 428/408 |
| 4,794,047 | 12/1988 | Funamoto | 428/408 |
| 4,804,590 | 2/1989 | Nakamura et al. | 428/408 |
| 4,816,334 | 3/1989 | Yokoyama et al. | 428/336 |
| 4,818,608 | 4/1989 | Furuyama | 428/327 |
| 4,820,584 | 4/1989 | Morita et al. | 428/336 |
| 4,839,244 | 6/1989 | Tsukamoto | 428/694 |
| 4,861,662 | 8/1989 | Kobliska et al. | 428/408 |

*Primary Examiner*—Nam Nguyen

[57] ABSTRACT

Method and magnetic transducer head characterized by enhanced coating of wear resistant carbon layer over an insulating short circuit, preventing layer on a magnetic, data transferring, head.

3 Claims, 2 Drawing Sheets

METHOD FOR APPLYING A PROTECTIVE COATING ON A MAGNETIC RECORDING HEAD

This is a continuation of application Ser. No. 07/932,335 filed Aug. 19, 1992, now abandoned.

This invention pertains to a unique, insulated, sputtered carbon overcoating for magnetic heads such as magnetic transducers which are operable to read and/or write data to magnetic media such as magnetic discs. Such heads include a coil-containing head means mounted on a slider end.

The invention is characterized by enhanced adhesion of the wear resistant carbon overcoating on the magnetic head without degrading the electrical and/or magnetic properties of the head. This is accomplished by preventing electrical short circuiting of spaced components of the head during the carbon overcoating operation.

BACKGROUND OF THE INVENTION

The prior art is replete with examples of the application of carbon in various forms to magnetic media, etc. for the purpose of providing wear resistance and/or lubricity. Representative of such prior art disclosures are the following:

| PATENT # | INVENTOR | ASSIGNEE |
| --- | --- | --- |
| RE 32,464 (1987) | Aine | |
| 2,804,401 (1957) | B. A. Cousino | |
| 4,060,660 (1977) | Carlson et al | RCA Corporation |
| 4,277,540 (1981) | Aine | |
| 4,411,963 (1983) | Aine | |
| 4,486,286 (1984) | Lewin et al | Nerken Research Corp. and Technion Research & Development Foundation, Ltd. |
| 4,495,242 (1985) | Arai et al | Fuji Photo Film Co., Ltd. |
| 4,524,106 (1985) | Flasck | Energy Conversion Devices, Inc. |
| 4,552,820 (1985) | Lin et al | Lin Data Corporation |
| 4,598,017 (1986) | Bayer et al | International Business Machines Corporation |
| 4,647,494 (1987) | Meyerson et al | International Business Machines Corporation |
| 4,661,409 (1987) | Kieser et al | Leybold-Heraeus GmbH |
| 4,664,976 (1987) | Kimura et al | Victor Company of Japan, Ltd. |
| 4,713,279 (1987) | Fujiwara et al | Fuji Electric Co., Ltd. |
| 4,713,288 (1987) | Kokaku et al | Hitachi, Ltd. |
| 4,717,622 (1988) | Kurokawa et al | Matsushita Electric Industrial Co., Ltd. |
| 4,725,470 (1988) | Katsuki | Alps Electric Co., Ltd. |
| 4,737,419 (1988) | Hilden et al | International Business Machines Corporation |
| 4,755,426 (1988) | Kokai et al | Hitachi Maxell, Ltd. |
| 4,774,130 (1988) | Endo et al | Hitachi Metals, Ltd. |
| 4,786,564 (1988) | Chen et al | Komag, Inc. |
| 4,789,598 (1988) | Howard et al | International Business Machines Corporation |
| 4,794,047 (1988) | Funamoto | Hitachi, Ltd. |
| 4,804,590 (1989) | Nakamura et al | Nihon Shinku Gijutsu Kabushiki Kaisha |
| 4,816,334 (1989) | Yokoyama et al | TDK Corporation |
| 4,818,608 (1989) | Furuyama | Matsushita Electric Industrial Co., Ltd. |
| 4,820,584 (1989) | Morita et al | Kabushiki Kaisha Toshiba |
| 4,839,244 (1989) | Tsukamoto | NEC Corporation |
| 4,861,662 (1989) | Kobliska et al | Akashic Memories Corporation |

It is to be noted that practitioners in the art have heretofore recognized the desirability of providing an adhesion enhancing, intermediate layer between the carbon overcoating and magnetic media of the type found in recording disks. Such prior art teachings include the following:

| PATENT # | INVENTOR | INTERMEDIATE LAYER |
| --- | --- | --- |
| 4,503,125 (1985) | Nelson et al | Titanium |
| 4,647,494 (1987) | Meyerson et al | Silicon |
| 4,661,409 (1987) | Kieser et al | Siloxanes, Silazanes, Polymers |
| 4,713,279 (1987) | Fujiwara et al | Silicon Oxide |
| 4,713,288 (1987) | Kokaku et al | Organic |
| 4,737,419 (1988) | Hilden et al | Organic Binder of Magnetic Layer |

In the three United States Aine patents noted in the first compilation above, i.e., U.S. Pat. Nos. 4,277,540, 4,411,963 and U.S. Pat. No. Re 32,464 there is specific reference made to the use of magnetic transducer head portions, which come into contact with recording media, being preferably formed of or coated with carbon.

The prior art disclosures notwithstanding, and even though patents such as those set forth in the second compilation above provide what appear to be insulating intermediate layers between magnetic media and carbon overcoating, such art totally fails to suggest or disclose the unique concept of the present invention. This unique concept is characterized by the provision of a protective wear coating such as carbon on a magnetic transducer head of the type used in magnetic recording where an insulating or substantially non-conductive, adhesion enhancing intermediate layer is provided between the carbon overcoating and the protected head surfaces. This insulating layer prevents electrical short circuiting or conductivity between spaced head portions which must retain distinct characteristics in order to be effective. These portions may comprise spaced contacts, spaced pole pieces, and or spaced head coil winding elements.

In this manner, degradation of the recording/reading capabilities of the head is prevented while achieving the distinct advantages of enhancing the adhesion of the protective overcoating to the head.

It is recognized that in the prior art it has been suggested, for example in Bajorek et al U.S. Pat. No. 4,918,554, that a shielded magnetostrictive sensor may be fabricated with alternating layers of insulating and conductive material with appropriate heat treating of these layers being required.

This technique is specifically disclosed as being intended to avoid the problems due to scratching or smearing during use of the unit which could create short circuit conducting pads between the leading shield and sensor layers, thereby resulting in sensor shorting. This wholly distinct concept involves considerations distinct from those of the present invention which relate to the application of a protective wear resistant overcoating to a magnetic head through a technique which prevents degradation of the magnetic properties of the head during the application of the wear resistant coating itself. In this way, the gap between spaced head or pole segments, head coil windings, and/or head coil contacts is prevented from being occupied by conductive wear resistant material, such as carbon, through the prior, intervening application of a non-conductive or insulating, adhesion promoting layer.

SUMMARY OF THE INVENTION

The present invention is characterized by independently significant method, apparatus and coated head aspects. These aspects are delineated in the appended claims included in this application.

Basic method aspects of the invention may be characterized as follows:

A method is provided for applying a protective, electrically conductive coating to magnetic heads for reading and/or writing magnetic media data without substantially degrading a non-conductive zone between spaced head segments. This method comprises:

depositing, by sputter coating, a substantially non-electrically conductive, electrically insulating layer upon portions of a magnetic head to be coated with the protective, electrically conductive coating;

the sputter coating of the substantially non-conductive, electrically insulating layer including the subjecting of spaced surfaces of the spaced head segments to the aforesaid depositing; and depositing, by sputter coating, an electrically conductive, protective layer upon the substantially non-electrically conductive, electrically insulating layer deposited on the portions of said magnetic head; with the substantially, non-electrically conductive, electrically insulating layer providing and enhancing adhesive bonding of the electrically conductive, protective layer to the magnetic head.

Basic apparatus aspects of the invention are characterized by the following apparatus concept:

An apparatus is presented for applying a protective, electrically conductive coating to magnetic heads for reading and/or writing magnetic media data without substantially degrading a non-conductive zone between spaced head segments. This apparatus comprises:

means for depositing, by sputter coating, a substantially non-electrically conductive, electrically insulating layer upon portions of a magnetic head to be coated with the protective, electrically conductive coating;

the sputter coating of the substantially non-conductive, electrically insulating layer including the subjecting of spaced surfaces of the spaced head segments to the aforesaid depositing; and means for depositing, by sputter coating, an electrically conductive, protective layer upon the substantially non-electrically conductive, electrically insulating layer deposited on the portions of said magnetic head; with the substantially, non-electrically conductive, electrically insulating layer providing and enhancing adhesive bonding of the electrically conductive, protective layer to the magnetic head.

Independently significant, coated head aspects of the invention are defined as follows:

A magnetic head is produced for reading and or writing magnetic media data, this head being provided with a protective electrically conductive coating applied thereto without substantially degrading a non-conductive zone between spaced head segments. This magnetic head comprises:

a substantially non-electrically conductive, electrically insulating layer deposited by sputter coating upon portions of a magnetic head to be coated with the protective, electrically conductive coating;

the sputter coating of the substantially non-conductive, electrically insulating layer having subjected spaced surfaces of the spaced head segments to the aforesaid depositing; and an electrically conductive, protective layer deposited by sputter coating upon the substantially non-electrically conductive, electrically insulating layer deposited on the portions of the magnetic head; with the substantially, non-electrically conductive, electrically insulating layer providing and enhancing adhesive bonding of the electrically conductive, protective layer to the magnetic head.

Each of the method, apparatus and coated head concepts as set forth above entails a more specific inventive aspect involving the utilization of a particular combination of 1) carbon as the protective layer, and 2) titanium oxide as the insulating, adhesion promoting layer operable to prevent degradation or short circuiting between spaced portions of the head. This more refined concept of these inventive aspects entails:

the electrically conductive protective layer comprising sputtered carbon; and the substantially non-electrically conductive, electrically insulating layer comprising sputtered titanium oxide; with the titanium oxide defining an insulating layer
interposed between the electrically conductive carbon coating and spaced portions of the spaced head segments, and
operable to prevent substantially electrical shorting between the spaced sensing portions.

Finally, in particularly preferred aspects of the invention, each of the aforementioned method, apparatus, and coated head concepts is characterized by the following specific parameters:

the sputtered titanium oxide insulating layer is sputter deposited as a layer having a thickness of about five (5) to about two hundred (200) angstroms;

the sputtered carbon electrically conductive protective layer is sputter deposited as a layer having a thickness of about twenty (20) to about four hundred (400) angstroms;

the sputtered titanium oxide is operable to substantially enhance adhesion of said sputtered carbon to the spaced head segments; and the sputtered carbon is operable to substantially enhance resistance to disc wear of the spaced head segments by a factor of at least about thirty.

DRAWINGS

In describing the invention, reference will be made to the appended drawings by way of overview and example, but not by way of limitation. This drawing depiction is set forth to facilitate an understanding of the invention, taken in conjunction with the ensuing description of the presently preferred embodiments of the invention.

Figure 2:
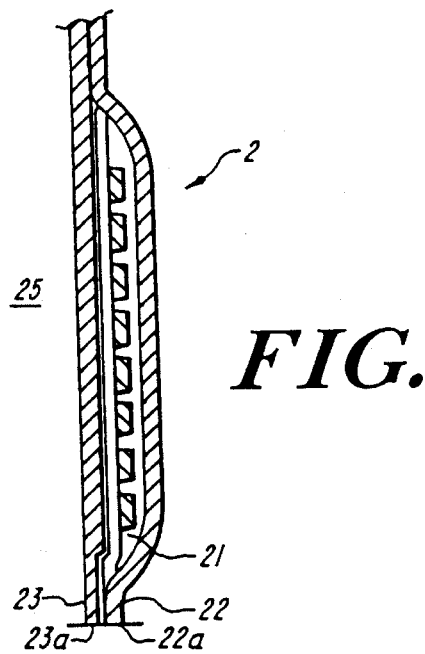
Figure 3:
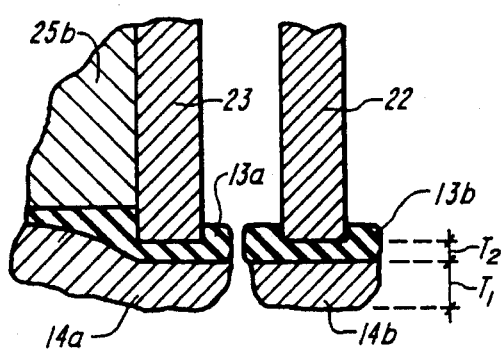
Figure 4:
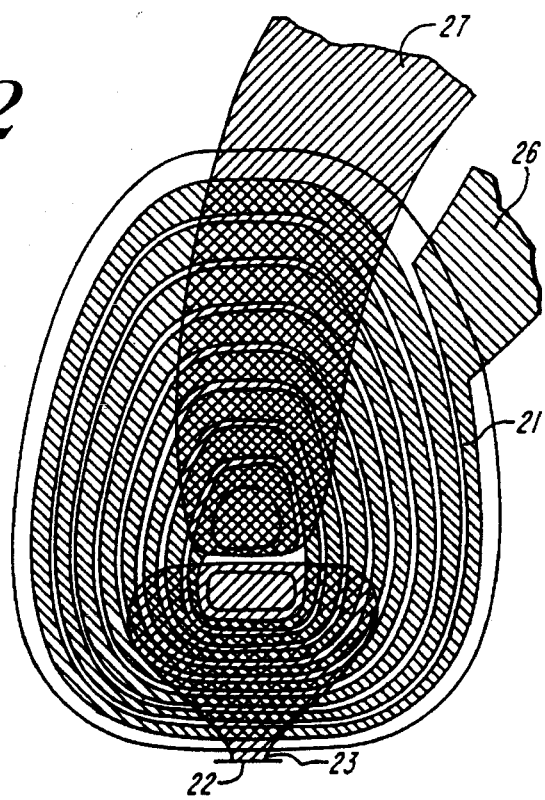
Figure 5:
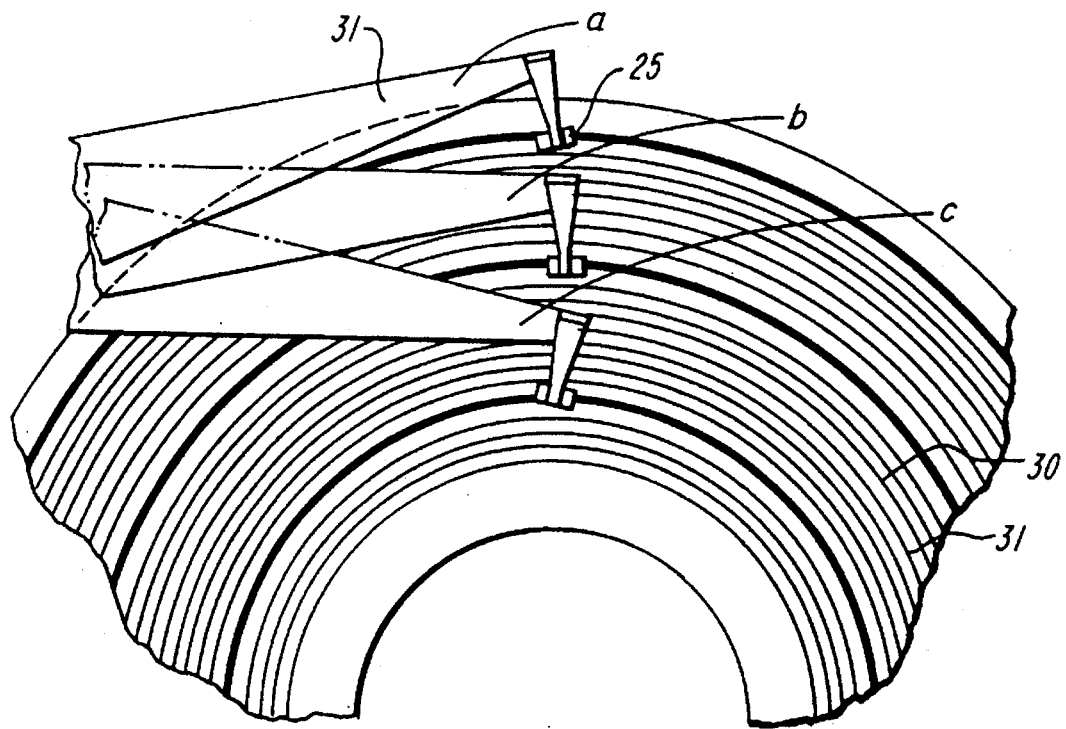
Figure 6:
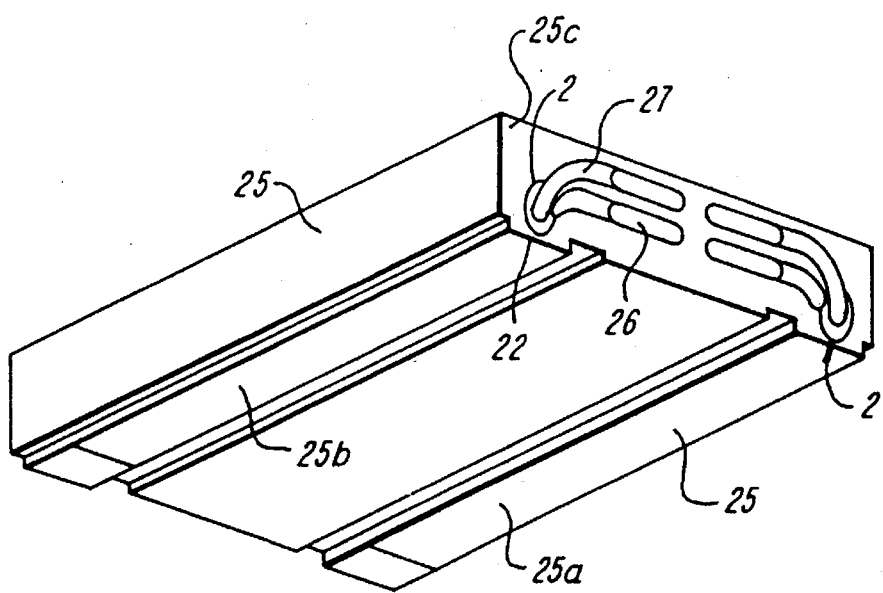

In the drawings:

FIG. 1 provides a schematic illustration of a sputtering line showing the sequential application of a sputtered, insulating layer and a sputtered, wear resistant layer to a magnetic transducer or recording head of the type employed in reading and writing data to and from magnetic media such as thin film disks;

FIG. 2 provides an enlarged, somewhat schematic, transverse cross-sectional view of a representative, slider-mounted magnetic transducer or recording head of the type described above, illustrating spaced pole or tip portions which are to be made more wear resistant in accordance with the uniquely beneficial aspects of the present invention;

FIG. 3 affords an enlarged, schematic, view of the pole extremities of the FIG. 2 recording head illustrating the sequential layering of titanium oxide and carbon, according to the presently preferred embodiment of the invention;

FIG. 4 provides an end elevational, schematic view of the FIG. 2 head;

FIG. 5 provides a schematic, top plan view of a slider mounted head assembly in disc read/write positions; and FIG. 6 provides a schematic view of the underside of the head supporting, slider end.

In the drawings, elements are not dimensioned to scale and thickness of layers are exaggerated for ease of illustration.

DESCRIPTION OF PRESENTLY PREFERRED EMBODIMENTS

In describing presently preferred embodiments of the invention, a basic overview of the invention will first be provided. Thereafter, individual discussions of method, apparatus, and coated head aspects of the invention will be presented.

Basic Overview

A technique is presented through this invention by means of which an improvement in disk wear resistance by a factor of thirty or more can be obtained. This is accomplished, in a preferred embodiment, by sputtering a thin layer of carbon, which may be hydrogenated and have a thickness $T_1$ of about 20–400 angstroms on magnetic recording heads using an intervening titanium oxide ($Ti_2O$) adhesion layer having a thickness $T_2$ of about 5–200 angstroms. This latter layer is substantially, electrically non-conductive.

Because of its insulating properties, the titanium oxide layer, in addition to providing enhanced adhesion of the carbon wear protecting layer to the magnetic head, serves to prevent the sensor windings of the head from being electrically shorted or rendered ineffective or degraded due to the short circuiting presence of the electrically conductive, wear resistant carbon.

Through this technique, it is possible to sputter an entire head, including the adjacent portions of the associated slider mechanism, without degrading, to any significant extent the signal and glide performance of the head.

Most significantly, the present invention provides a technique for obtaining optimal benefits which result from thicker layers of sputtered carbon overcoat material without entertaining the performance degrading, short circuiting problems. Such would tend to arise from the sputter deposition of carbon, without an intervening insulating layer of the present invention.

In this connection, it is to be noted that disk wear resistance has been found to be improved by a factor of four when depositing a layer of carbon on recording heads at a thickness of about fifty (50) angstroms. This wear resistance has been noted to increase up to an improvement factor of about twenty-one when the carbon thickness was increased to about one hundred (100) angstroms. Further carbon thickness increases up to about one hundred fifty angstroms (150) will only marginally improve wear. However, increasing the deposition voltage will substantially enhance wear resistance. As a result of the utilization of the present invention, with the intervening presence, via sputter deposition, of an insulating, adhesion enhancing layer, optimal benefits of coating thickness and optimal deposition voltage are able to be accomplished.

Moreover, in achieving these advantages, the sputtered carbon/titanium oxide coated heads are characterized by a significant reduction in stiction properties. It has been observed that heads prepared in accordance with the present invention are generally characterized by stiction measurements on the order of four grams or less, even after prolonged test cycles (i.e., thirty five thousand cycles) whereas the peak stiction for samples without coating ranged from five grams to fifteen grams after twenty thousand test cycles.

The manner in which the present invention is practiced may best be appreciated by reference to FIGS. 1 and 2.

In FIG. 1, a sputtering system 1 is depicted including an array 11 of sputter stations and a head transporting zone 12 which serves to move heads to be coated from one sputtering station to another.

As will be appreciated, the sputtering system 1 is shown in schematic form, with only the sputter stations involving the present invention being depicted.

Thus, the sputtering station line or cathode array 11 includes a titanium oxide sputtering station 13 which is operated, with respect to the sputtering of any individual head, prior to the head being positioned in sputtering proximity to a carbon sputtering station 14.

Stations 13 and 14 operate in accordance with conventional, now well understood technology involving the sputtering application of thin films, with appropriate cathode targets of the materials involved being provided at each station. Thus, at station 13 the sputtering target would be a titanium oxide target of a conventional commercially available type and the carbon station 14 would include a carbon cathode target, also commercially available, and of the type conventionally employed in providing wear resistant carbon overcoating for magnetic media, etc.

In the head transporting area 12, a slider mounted head supporting and transporting mechanism 15, of a conventional type, serves to support a magnetic transducer or recording head 2 mounted on a slider 25 with its spaced pole portions to be wear protected, i.e., portions 22 and 23, facing toward the target at station 13. With the head thus supported, it is appropriately positioned to be sputter coated with the intervening, carbon adhesion promoting, but electrically insulating, layer of titanium oxide.

During the sputtering operation, the slider 25 and its end supported head means 2 would normally be moved along its longitudinal axis, past the sputter stations so as to sequentially expose the head windings 21 and contacts 26, 27 and then the pole tips, and slider rails to sputter deposition action. In other words, the slider 25 would be moved generally as shown in FIG. 6, across the sputter targets at stations 13 and 14.

Subsequent to the application of the insulating titanium oxide layer, the assembly 15 is moved to location 15a (or possibly positioned in proximity to station 14 by relative movement of the sputter station 14) so as to position the head to receive the sputter carbon wear resistant layer.

After the head and slider have been thus coated, with the pole portions 22 and 23, and/or head windings 21 and contacts 26, 27 and slider rail portions being coated sequentially with titanium oxide as an insulating and adhesion promoting layer and then carbon as a wear resistant layer, suitable post-sputtering treatment of a variety of conventional natures may be provided, if desired.

In connection with the sputtering operation, it will be noted that in FIG. 2, the head is depicted with the poles oriented downwardly, in the manner in which they would be conventionally oriented in a disk drive mechanism where the disk is rotating about a vertical axis and with the media layer to be read/written to facing upwardly. The head 2 would be supported by a conventional slider mechanism 25 so as to be able to be appropriately translated across the face of the disk media from track to track, as appropriate.

As is shown in FIGS. 5 and 6, slider 25 is mounted on a drive actuator arm with rail portions 25a and 25b facing a thin film disc 30. A pair of heads 2 is normally mounted on the slider end 25c, as shown in FIG. 6, with only one of these heads normally being operable. Arm 31 serves to translate the slider across the tracks 31 of disc 30 for read/write purposes.

As is shown in FIG. 4 and FIG. 6, the windings 21 and contacts 26, 27 of operative head 2 are normally somewhat exposed, i.e., subject to sputtering deposition during the aforesaid, sequential, application of titanium oxide and carbon. Because of this exposure, as the slider 25 and head means 2 move past the sputtering stations, the windings and contacts are exposed to sputter deposition, along with the poles 22 and 23. However, the intervening presence of the insulating titanium oxide prevents the conductive carbon from shorting these components when this wear protecting material is applied.

Through the present invention, the deposition of wear resistant carbon is able to be effective at optimal depth thicknesses and, application voltages without electrically short circuiting the very closely spaced and minute poles 22 and 23 and without short circuiting the electrical windings 21 or winding contacts 26, 27 incorporated within the head. Moreover, this head sputtering may be accomplished even with the head mounted on a slider without short circuiting the head or its associated slider.

Method Aspects

The basic method of this invention is operative to apply a protective, electrically conductive coating to magnetic heads for reading and/or writing magnetic media data without substantially degrading the desired electrical characteristics of spaced head or pole segments 22 and 23. This is accomplished by depositing, by sputter coating at station 13, a substantially non-electrically conductive, electrically insulating layer 13a and 15b upon portions 22 and 23 respectively of a magnetic head 2 to be coated with this protective, electrically conductive coating. This sputter coating of the substantially non-conductive, electrically insulating layer includes the subjecting of spaced tip surfaces 22a and 23a of the spaced head segments to the aforesaid depositing. Subsequently, there is deposited by sputter coating, an electrically conductive, protective layer 14a and 14b upon the substantially non-electrically conductive, electrically insulating layers 13a and 13b previously deposited on the portions of the magnetic head. The substantially, non-electrically conductive, electrically insulating layers 13a and 15b provide an adhesive enhancing bonding of the electrically conductive, protective layers 14a and 14b to the magnetic head 2.

Preferably, the electrically conductive protective layer comprises sputtered carbon and the substantially non-electrically conductive, electrically insulating layer comprises sputtered titanium oxide. The titanium oxide defines an insulating layer interposed between the electrically conductive carbon coating and spaced sensing portions of the spaced head segments, and operable to prevent substantially electrical shorting between said spaced sensing portions and short circuiting of the head coil windings and contacts.

As the invention is presently viewed, the sputtered titanium oxide insulating layer is sputter deposited as a layer having a thickness $T_2$ of about five (5) to about two hundred (200) angstroms. The sputtered carbon electrically conductive protective layer is sputter deposited as a layer having a thickness $T_1$ of about twenty (20) to about four hundred (400) angstroms. The sputtered titanium oxide is operable to substantially enhance adhesion of the sputtered carbon to the spaced head segments. Further, the sputtered carbon is operable to substantially enhance resistance to disc wear of said spaced head segments by a factor of at least about thirty.

As will be understood, the close proximity of head pole extremities 22 and 23 may well result in some bridging of the gap or zone between these heads by sputtered material. However, the insulating nature of the layer means 13a and 13b will serve to prevent pole short circuiting, even in the presence by such bridging.

Apparatus Aspects

The basic apparatus concept of this invention provides means 1 operative to apply a protective, electrically conductive coating to magnetic heads for reading and/or writing magnetic media data without short circuiting or degrading a path between spaced head segments 22 and 23 or head coil windings or contacts. This is accomplished by depositing, with sputter coating 13, a substantially non-electrically conductive, electrically insulating layer 13a and 13b upon portions 22 and 23 respectively of a magnetic head 2 to be coated with this protective, electrically conductive coating. This sputter coating of the substantially non-conductive, electrically insulating layer includes the subjecting of opposed spaced tip surfaces 22 and 23a of the spaced head segments to the aforesaid depositing. Subsequently, sputter station 14 deposits by sputter coating, an electrically conductive, protective layer 14a and 14b upon the substantially non-electrically conductive, electrically insulating layers 13a and 13b previously deposited on the portions of the magnetic head. The substantially, non-electrically conductive, electrically insulating layers 13a and 15b provide an adhesive enhancing bonding of the electrically conductive, protective layers 14a and 14b to the magnetic head 2.

Preferably, sputter station 14 deposits an electrically conductive protective layer comprising sputtered carbon and sputter station 13 deposits a substantially non-electrically conductive, electrically insulating layer comprising sputtered titanium oxide. The titanium oxide defines an insulating layer interposed between the electrically conductive carbon coating and spaced sensing portions of the spaced head segments, and is operable to prevent substantially electrical shorting between said spaced sensing portions and short circuiting of exposed head coil and coil contact elements.

As the invention is presently viewed, the sputtered titanium oxide insulating layer is sputter deposited as a layer having a thickness $T_2$ of about five (5) to about two hundred (200) angstroms. The sputtered carbon electrically conductive protective layer is sputter deposited as a layer having a thickness $T_1$ of about twenty (20) to about four hundred (400) angstroms. As was earlier noted, the sputtered titanium oxide is operable to substantially enhance adhesion of the sputtered carbon to the spaced head segments and the sputtered carbon is operable to substantially enhance resistance to disc wear.

Coated Head Aspects

The enhanced magnetic transducer or magnetic recording head of this invention is characterized by the presence of a protective, electrically conductive coating which avoids substantially degradation or short circuiting of spaced head segments 22 and 23. This is accomplished by depositing, by sputter coating at station 13, a substantially non-electrically conductive, electrically insulating layer 13a and 15b upon portions 22 and 23 respectively of a magnetic head 2 to be coated with this protective, electrically conductive coating. This sputter coating of the substantially non-conductive, electrically insulating layer includes the subjecting of opposed spaced tip surfaces 22 and 23a of the spaced head segments to the aforesaid depositing. Subsequently, there is deposited by sputter coating, an electrically conductive, protective layer 14a and 14b upon the substantially non-electrically conductive, electrically insulating layers 13a and 13b previously deposited on the portions of the magnetic head. The substantially, non-electrically conductive, electrically insulating layers 13a and 5b provide an adhesive enhancing bonding of the electrically conductive, protective layers 14a and 14b to the magnetic head 2.

Preferably, the electrically conductive protective layer comprises sputtered carbon and the substantially non-electrically conductive, electrically insulating layer comprises sputtered titanium oxide. The titanium oxide defines an insulating layer interposed between the electrically conductive carbon coating and spaced sensing portions of the spaced head segments, and is operable to prevent substantially electrical shorting between the spaced sensing portions and/or short circuiting of exposed head coil and contact means.

As the invention is presently viewed, the sputtered titanium oxide insulating layer is sputter deposited as a layer having a thickness $T_2$ of about five (5) to about two hundred (200) angstroms. The sputtered carbon electrically conductive protective layer is sputter deposited as a layer having a thickness $T_1$ of about twenty (20) to about four hundred (400) angstroms. The sputtered titanium oxide is operable to substantially enhance adhesion of the sputtered carbon to the spaced head segments while the sputtered carbon is operable to substantially enhance resistance to disc wear of said spaced head segments by a factor of at least about thirty.

SUMMARY OF ADVANTAGES, NON-OBVIOUSNESS, AND SCOPE OF INVENTION

The present invention is uniquely adapted to improving operating characteristics of magnetic transducers or recording heads of the type employed in connection with thin film disk drives.

Through the invention, wear resistance and lubricity of the head are able to be significantly improved without significantly degrading the electrical characteristics of the recording head itself.

This able to be accomplished by sequential deposition of an insulating layer which serves concurrently to enhance adhesion of the protective wear resistant layer to the head and slider rails.

Through the utilization of the titanium oxide insulating and adhesion enhancing layer in association with the sputter carbon wear resistant layer, improvements of wear resistance for magnetic recording heads (i.e., assembly of head and slider means) of the type described above have been able to be achieved, with improvements being realized at an enhancement factor of thirty times or greater, i.e., a resistance to improvement of thirty times or more the greater resistance.

The state of the prior art, as exemplified above, while being pre-occupied with carbon coating for media, and while recognizing carbon coating for recording heads, fails to suggest or anticipate the concept of the present invention as delineated in the appended claims.

In defining the invention in the appended claims, those skilled in the art and familiar with the disclosure of the present invention will doubtless recognize additions, deletions, substitutions, the use of equivalent elements, and other changes, all of which would fall within the scope of these appended claims.

What is claimed is:

1. A method for applying a protective, electrically conductive coating to magnetic heads for reading and/or writing magnetic media data without substantially degrading a non-conductive zone between spaced head segments, said method comprising:

depositing, by sputter coating, an electrically insulating layer upon portions of a magnetic head to be coated with said protective, electrically conductive coating;
said sputter coating of said electrically insulating layer including subjecting of spaced surfaces of said spaced head segments to said depositing; and depositing, by sputter coating, an electrically conductive, protective layer upon said electrically insulating layer deposited on said portions of said magnetic head;

said electrically insulating layer providing and enhancing adhesive bonding of said electrically conductive, protective layer to said magnetic head;

said magnetic head being supported on a slider;

said electrically insulating layer being applied to each of said slider and said spaced head segments;

said depositing of said electrically insulating layer being operable to concurrently prevent short-circuiting between said spaced head segments and insulatingly coat head segment supporting portions of said slider; and said depositing of said electrically insulating layer being concurrently operable to
prevent degradation of electrical characteristics of said magnetic head
by said electrically conductive coating,
enhance adhesion of said electrically conductive coating to said magnetic head, and
enhance wear resistance of said magnetic head.

2. A method as described in claim 1 wherein:

said electrically conductive protective layer comprises sputtered carbon; and said electrically insulating layer comprises sputtered titanium oxide;

said titanium oxide defining an electrically insulating layer interposed between said electrically conductive carbon coating and spaced portions of said spaced head segments, and operable to prevent substantially electrical shorting between said spaced portions.

3. A method as described in claim 2 wherein:

said sputtered titanium oxide insulating layer is sputter deposited as a layer having a thickness of about five (5) to about two hundred (200) angstroms;

said sputtered carbon electrically conductive protective layer is sputter deposited as a layer having a thickness of about twenty (20) to about four hundred (400) angstroms;

said sputtered titanium oxide being operable to substantially enhance adhesion of said sputtered carbon to said spaced head segments; and said sputtered carbon being operable to substantially enhance resistance to disc wear of said spaced head segments by a factor of at least about thirty.

* * * * *